United States Patent
Wills et al.

(10) Patent No.: US 7,681,176 B2
(45) Date of Patent: Mar. 16, 2010

(54) GENERATING A GRAPHICAL DESIGNER APPLICATION FOR DEVELOPING GRAPHICAL MODELS

(75) Inventors: Alan C. Wills, Carlton (GB); Gareth A. Jones, Lower Cambourne (GB); Jochen Seemann, Duvall, WA (US); Stephen J. Cook, Bishop's Stortford (GB); Stuart J. H. Kent, Canterbury (GB)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 11/073,012

(22) Filed: Mar. 4, 2005

(65) Prior Publication Data

US 2006/0200799 A1    Sep. 7, 2006

(51) Int. Cl.
G06F 9/44 (2006.01)
(52) U.S. Cl. ................. 717/109; 717/104; 717/110
(58) Field of Classification Search ......... 717/106–113, 717/104
See application file for complete search history.

(56) References Cited

U.S. PATENT DOCUMENTS 6,237,136 B1 * 5/2001 Sadahiro ............... 717/110
2003/0163603 A1 * 8/2003 Fry et al. ................ 709/328

OTHER PUBLICATIONS

"Oracle9i Developer Suite", A Product White Paper, Dec. 2001.*
"Tutorials", MetaEdit+ 3.0 documentation, MetaCase Consulting; retrieved from http://web.archive.org/web/20030827103438/www.metacase.com/support/30/manuals/ on Oct. 12, 2007.*
One (1) page printed on Feb. 1, 2005 from website: http://www.isis.vanderbilt.edu/Projects/gme/, regarding the Generic Modeling Environment.
Three (3) pages printed on Feb. 1, 2005 from website: http://www.metacase.com, regarding the MetaEdit+® metaCASE tool.

* cited by examiner

*Primary Examiner*—Wei Y Zhen
*Assistant Examiner*—Phillip H Nguyen
(74) *Attorney, Agent, or Firm*—Wolf, Greenfield & Sacks, P.C.

(57) ABSTRACT

Source code of a graphical designer application may be generated from a definition of graphical elements that can be employed to develop graphical models using the graphical designer application, a definition of one or more object types that can be represented in graphical models developed using the graphical designer application, and a definition of a mapping between the one or more object types and the graphical elements. One or more of these definitions may be stored within a file formatted in accordance with a markup language such as SGML or XML. The graphical designer application may be customized and extended by modifying one or more of the definitions and regenerating the source code and/or by modifying the source code itself. One or more of the definitions may be generated based on a graphical designer template corresponding to a particular model domain.

11 Claims, 7 Drawing Sheets

GENERATING A GRAPHICAL DESIGNER APPLICATION FOR DEVELOPING GRAPHICAL MODELS

BACKGROUND

Graphical models are widely used in today's business world for various purposes, including data modeling, business process modeling and technical software modeling such as, for example, class modeling, deployment modeling, etc.

Different options are available today for developing models. Drawing tools (e.g., versions of Microsoft® Visio® available from the Microsoft Corporation) typically provide a variety of graphical elements and a relatively high level of flexibility in drawing models. Thus, they can be used to draw models for almost any domain (e.g., business models, data models, technical software models such as class and deployment modeling, etc.) However, drawing tools are limited to providing a graphical representation of a domain, and do not define relationships (e.g., properties) between the graphical elements of the graphical representation and the objects of the domain that they represent. Thus, graphical models drawn using drawing tools do not provide a rich model of the domain being modeled that can be understood and used by other applications. For example, a user can develop a graphical model of a business process using a drawing tool, but generating a process model simulation from the graphical model would be either extremely difficult or impossible.

Graphical designer applications (e.g., modeling tools), on the other hand, typically define strong relationships between the diagram elements and the objects of the model domain that they represent. This is because graphical designers typically are designed for a specific graphical-modeling language (e.g., the Unified Modeling Language (UML)) and/or for a specific model domain (e.g., business workflows). Accordingly, graphical designers typically provide strong support for the syntax and semantics of the particular graphical-modeling language for which they are designed. However, the extensibility and customizability of known graphical designers is limited. Although some graphical designers offer limited user-definable features, which allow users to customize such tools to a certain degree, the vast majority of the functionality of such designers is hard-coded and thus cannot be changed by the user. As a result, graphical designers are difficult to customize and extend to develop graphical models for model domains that require object types, properties, relationships, etc. not within the predefined parameters of the graphical designer.

SUMMARY

Applicants have recognized the need for a graphical designer application with improved customizability and extensibility.

Described herein are systems and methods for creating and/or executing a graphical designer application for developing graphical models, for example, using a particular graphical-modeling programming language and/or for a particular model domain.

Source code of a graphical designer application may be generated from: a definition of graphical elements that can be employed to develop graphical models using the graphical designer application; a definition of one or more object types that can be represented in graphical models developed using the graphical designer application; and a definition of a mapping between the one or more object types and the graphical elements. One or more of these definitions may be stored within a file formatted in accordance with a markup language such as SGML or XML, or, alternatively, in a special-purpose textual language, or even in a binary format.

In addition to source code of a graphical designer application, other components of the graphical designer application may be generated from the above definitions, such as, for example, data files. These data files may include resource files (e.g., bit maps and strings), templates and other data files to be used by the graphical designer application during execution. Together, the generated source code and one or more data files may define a complete graphical designer application ready to be compiled and executed without further modification.

In some embodiments of the invention, the graphical designer application (defined by at least the source code, and possible by data files as well) may be configured to be integrated within an Integrated Development Environment (IDE). For example, when the source code (and possibly data files) are generated, the graphical designer application may be registered with an IDE such as, for example Microsoft® Visual Studio® (MVS). A user (e.g., a graphical design developer) then may launch the graphical designer application from within the IDE. The graphical designer application may be configured to use a graphical designer development framework (described below) to assist the user in developing graphical models.

The graphical designer application may be customized and extended by modifying one or more of the definitions and regenerating the source code and/or by modifying the source code itself. One or more user interfaces may be provided to enable users to modify one or more of the definitions and/or the source code. One of such user interfaces may include a domain model designer to modify one or more of the definitions. The term "domain model" is often referred to as an "object model" or "meta model" by those of skill in the field of developing graphical modeling tools.

One or more of the definitions may be generated based on a graphical designer template corresponding to a particular model domain, where the template may have been selected by a user, for example, using a user interface (e.g., a wizard). A plurality of selectable templates may be made available by the user interface, each template corresponding to a particular model domain.

A graphical designer development framework may be provided to assist developing graphical designer applications. As used herein a "framework" is a re-usable (and typically relatively basic) design structure including one or more pre-defined software components (e.g., abstract and/or concrete classes of an object-oriented programming language) that assist in building applications.

Designer constraints may be applied to one or more of the definitions (e.g., during generation of the source code) to verify that the one or more definitions conform with the constraints. Applying designer constraints may include ensuring that the one or more definitions define a working graphical designer application, which may include verifying that the one or more definitions are syntactically correct (e.g., by applying an XML schema definition (XSD) and/or applying other constraints defined by a graphical designer development framework or other code. Further, designer constraints may be applied to the generated source code and other generated components defining the graphical designers application. These designer constraints may be applied by a graphical designer development framework and/or other code.

The systems and method described herein provide graphical designer applications having greater customizability and extensibility than known graphical designer applications.

This added flexibility may provide new lines of business, where graphical designer applications are custom-made, for example, for specific programming languages and/or model domains. A customer (e.g., a consultant) can provide designer specifications to a vendor, and the vendor can develop (e.g., using the systems and/or methods described herein) and deliver to the customer, among other things, the source code and definitions (e.g., as files) of the requested graphical designer application. The customer can develop graphical models by simply compiling the source code and executing the graphical designer application. In addition, the customer can customize and/or extend the graphical designer application by modifying the source code and/or one or more of the definitions (using the systems and/or methods described herein).

In an embodiment of the invention, a graphical designer application is developed to be used in developing graphical models. A definition of graphical elements is received that can be employed by users of the graphical designer application to develop graphical models using the graphical designer application. A definition of one or more object types that can be represented in graphical models is developed. Source code defining at least a portion of the graphical designer application is generated from at least the graphical elements definition and the object types definition.

In an aspect of this embodiment, the graphical elements definition and the object types definition are part of one or more files. Receiving the graphical elements definition includes receiving at least one of the one or more files. Receiving the object types definition includes receiving at least one of the one or more files.

In another aspect of this embodiment, one or more data files to be accessed by the graphical designer application during execution are generated from at least the graphical element definition and the object types definition. The source code and/or one or more data files together define the graphical designer application, ready for compilation and execution without further modification.

In another aspect of this embodiment, a definition of a mapping between the one or more object types and the graphical elements is received. Generating the source file includes generating the source code from at least the mapping definition.

In yet another aspect of this embodiment, the graphical elements definition and the mapping definition are part of a same file, and receiving the graphical elements includes receiving the file. In another aspect of this embodiment, this file is formatted in accordance with a mark-up language.

In another aspect of this embodiment, the source code is compiled to produce code for executing the graphical designer application.

In yet another aspect of this embodiment, functionality of the graphical designer application is modified by modifying one or more of the definitions and re-generating the source code from the modified definitions.

In another aspect of this embodiment, functionality of the graphical designer application is modified by modifying the source code.

In another aspect of this embodiment, a user interface is provided to enable a user to select a graphical designer template, and one or more of the definitions are generated based at least in part on the selected template.

In another aspect of this embodiment, a plurality of graphical designer templates are available for selection, each of the templates corresponding to a particular model domain, and the user is enabled to select one of the templates, from which the one or more templates are generated.

In yet another aspect of this embodiment, a user interface is provided enabling a user to specify modifications to one or more of the definitions.

In another aspect of this embodiment, generating the source code includes verifying that one or more of the definitions conform to pre-defined graphical designer constraints. In another aspect of this embodiment, the verifying includes applying an XML schema definition to the one or more definitions, the XML schema definition defining the graphical designer constraints.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided for developing a graphical designer application to be used in developing graphical models using a graphical-modeling programming language. The system includes a code generator operative to receive as input a definition of graphical elements that can be employed by users of the graphical designer application to develop graphical models using the graphical designer application, to receive as input a definition of one or more object types that can be represented in graphical models developed using the graphical designer application, to generate source code defining at least a portion of the graphical designer application from at least the graphical elements definition and the object types definition, and to output the source code.

In an aspect of this embodiment, the graphical elements definition and the object types definition are part of one or more files, and the code generator is operative to receive the one or more files.

In another aspect of this embodiment, the system includes a data files generator to generate, from at least the graphical elements definition and the object types definition, one or more data files to be accessed by the graphical designer application during execution. The source code and one or more data files together define the graphical designer application, ready for compilation and execution without further modification.

In another aspect of this embodiment, the code generator is operative to receive a definition of a mapping between the one or more object types and the graphical elements, and to generate the source code from at least the mapping definition.

In another aspect of this embodiment, the graphical elements definition and the mapping definition are part of a same file, and the code generator is operative to receive the file.

In yet another aspect of this embodiment, the file is formatted in accordance with a mark-up language.

In another aspect of this embodiment, the system includes a compiler to compile the source code to produce code for executing the graphical designer application.

In another aspect of this embodiment, the system includes a user interface enabling a user to modify functionality of the graphical designer application by modifying one or more of the definitions. The code generator is operative to re-generate the source code from the modified definitions.

In another aspect of this embodiment, the system includes a user interface enabling a user to modify functionality of the graphical designer application by modifying the source code.

In yet another aspect of this embodiment, the system includes a user interface enabling a user to select a graphical designer template, and a definitions generator to generate one or more of the definitions based at least in part on the selected template.

In another aspect of this embodiment, a plurality of graphical designer templates are available for selection, each of the templates corresponding to a particular model domain. The user interface is operative to enable the user to select one of the templates, from which the one or more templates are generated.

In another aspect of this embodiment, the system further includes a user interface to enable a user to specify modifications to one or more of the definitions.

In another aspect of this embodiment, the code generator is operative to verify that one or more of the definitions conform to pre-defined graphical designer constraints. In yet another aspect of this embodiment, the code generator is operative to verify by applying an XML schema definition to the one or more definitions, the XML schema definition defining the graphical designer constraints.

In another embodiment of the invention, a graphical designer application is provided for a graphical-modeling programming language to a customer. Specifications are received for the graphical designer application from the customer. Source code defining the graphical designer application is generated in accordance with the specifications, and the source code of the graphical designer application is delivered to the customer.

In another embodiment, a first business entity develops a graphical model using a graphical-modeling programming language. Source code developed by a second business entity independently of the first business entity is received. The source code defines a graphical designer application for developing graphical models using the graphical-modeling programming language. The source code is compiled to produce code for executing the graphical designer application. The graphical model is developed by executing the produced code and using the graphical designer application.

In an aspect of this embodiment, the source code is modified before it is compiled.

In another aspect of this embodiment, prior to receiving the generated source code, a specification of the graphical designer application is provided to the second business entity, where the received source code incorporates the desired attributes.

In another aspect of this embodiment, one or more files are received defining elements from which the source code was generated. At least one of the one or more files is modified and the source code is regenerated.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Various embodiments of the invention may be implemented in accordance with domain-specific languages (DSL) technologies and tools available from Microsoft Corporation. DSL technologies and tools are described and publicly available (as of the date of filing of this application) on the Internet on the Microsoft Delivery Network (MSDN), at the following website: http://lab.msdn.microsoft.com/teamsystem/workshop/dsltools/ (hereinafter, the "DSL website"), the entire contents of which are hereby incorporated by reference. Portions of the website are included in this application in Appendices I-V of this application, the entire contents of which are hereby incorporated by reference. Appendix I is title "Walkthrough: Domain-Specific Language (DSL) tools." Appendix II is titled "Walkthrough: Designer Definitions." Appendix III is titled "Walkthrough: Domain Model Designers." Appendix IV is untitled and Appendix V is titled "Software Factories: Assembling Applications with Patterns, Models, Frameworks and Tools." It should be appreciated that DSL technology, including the aspects of this technology described in Appendices I-V, is merely an illustrative example of a technology that may be used to implement embodiments of the invention, and is not intended to limit the scope of the invention. Other suitable technologies may be used.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

Although several examples described herein are described in relation to DSL technology and tools, the invention is not so limited. Embodiments of the invention may be implemented using other technologies and tools, which are intended to fall within the scope of the invention.

EXAMPLES

Figure 1:
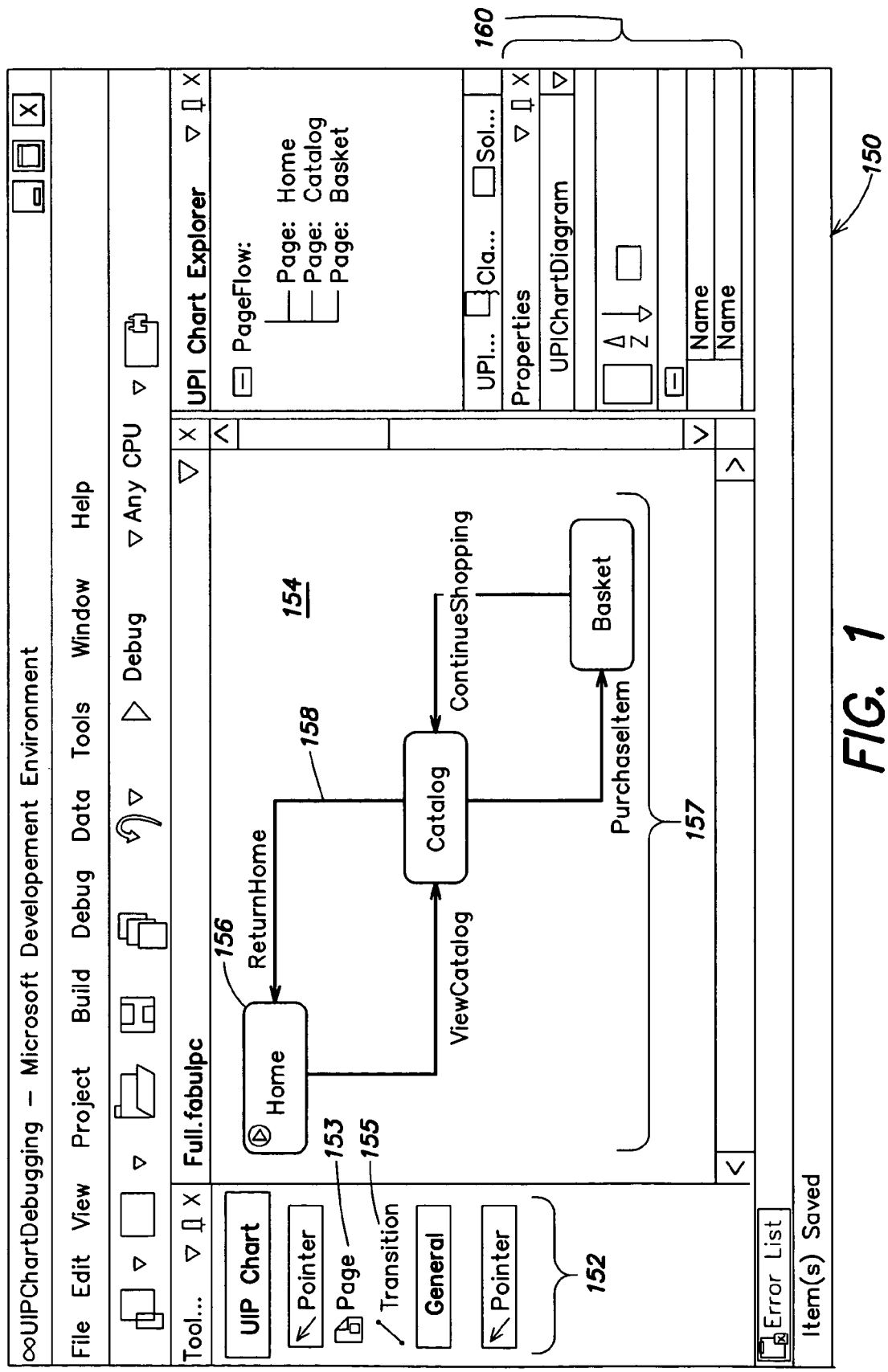
FIG. 1 is a screen shot illustrating an example of a user interface display of a graphical designer application in accordance with some embodiments of the invention.

FIG. 1 is a screen shot illustrating an example of a user interface display 150 of a graphical designer application in accordance with some embodiments of the invention. Such a graphical designer application may result from implementing one or more embodiments of the invention, including system 100 described below in relation to FIGS. 2A and 2B and/or method 500 described below in relation to FIG. 5. Display 150 is merely an illustrative embodiment of a user interface display of a graphical designer application, and is not intended to limit the scope of the invention. Any of numerous other implementations of such a display, for example, variations of display 150, are possible and are intended to fall within the scope of the invention.

Display 150 may be a display of a particular type of graphical designer application called a user interaction process (UIP) chart designer. Display 150 may include, among other elements, toolbox 152, drawing surface 154 and properties window 160. Toolbox 152 includes the tools (e.g., page tool 153 and transition tool 155) that may be used to construct a model on modeling surface 154. As shown in display 150, a UIP chart 157 has already been built on surface 154, the UIP chart 157 including several pages (e.g., Home page 156) depicted with rounded rectangles and a plurality of transitions (e.g., ReturnHome transition 158) by an arrow originating at a page from which transition is occurring, and ending at a page to which transition is occurring. The properties of any of the objects that have been added to surface 154 may be modified using properties window 160. Thus, UIP chart defines a collection of pages and transitions between pages. Pages are depicted as rounded rectangles containing names, and their descriptions may be accessed through the properties window 160. Transitions are indicated. Display 150 may be implemented as part of an IDE such as, for example, MVS. An example of a UIP chart designer is described in more detail in Appendix I.

Figure 2A:
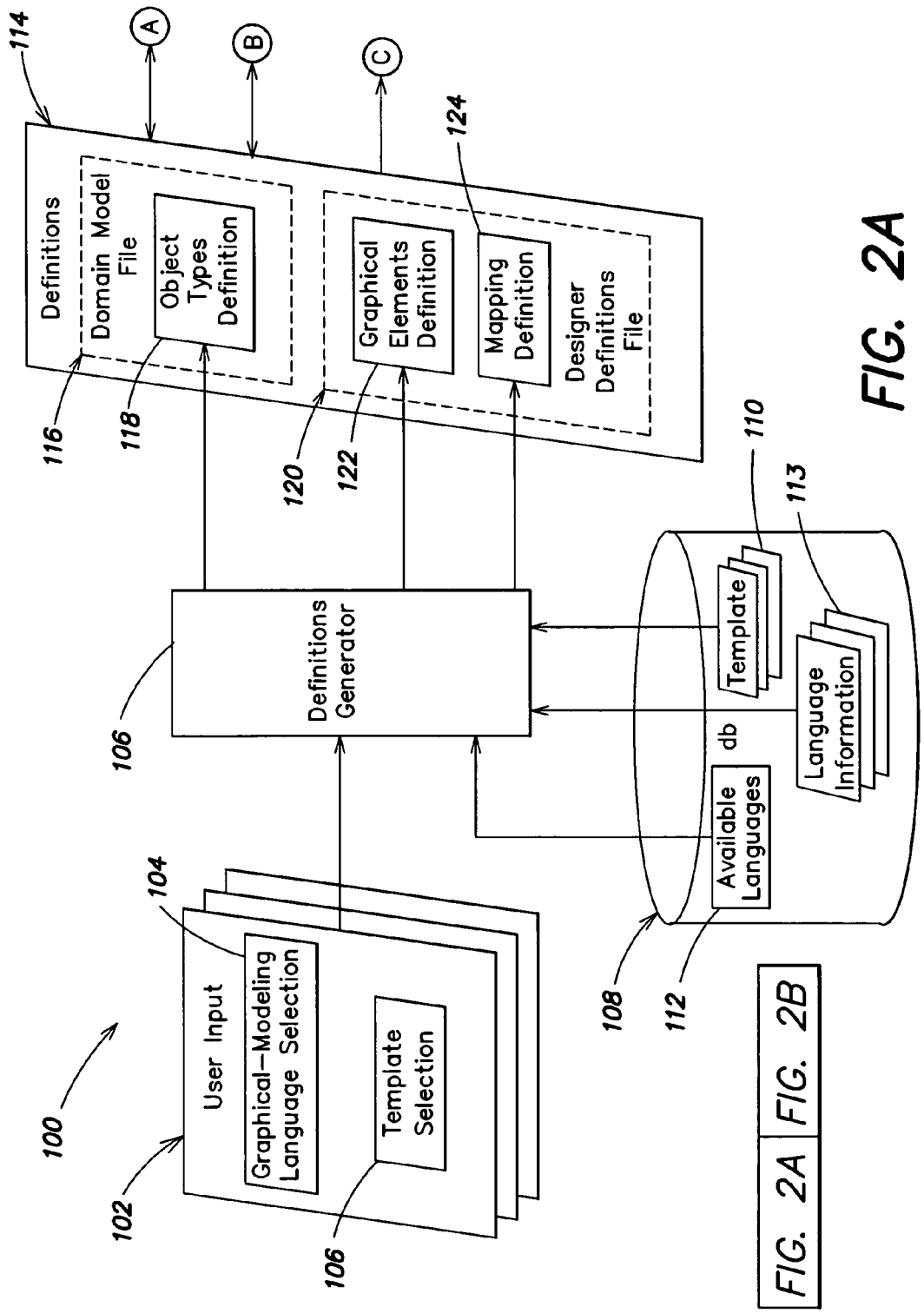
FIGS. 2A and 2B comprise a block diagram illustrating an example of a system for developing and/or executing a graphical designer application according to some embodiments of the invention.
Figure 2B:
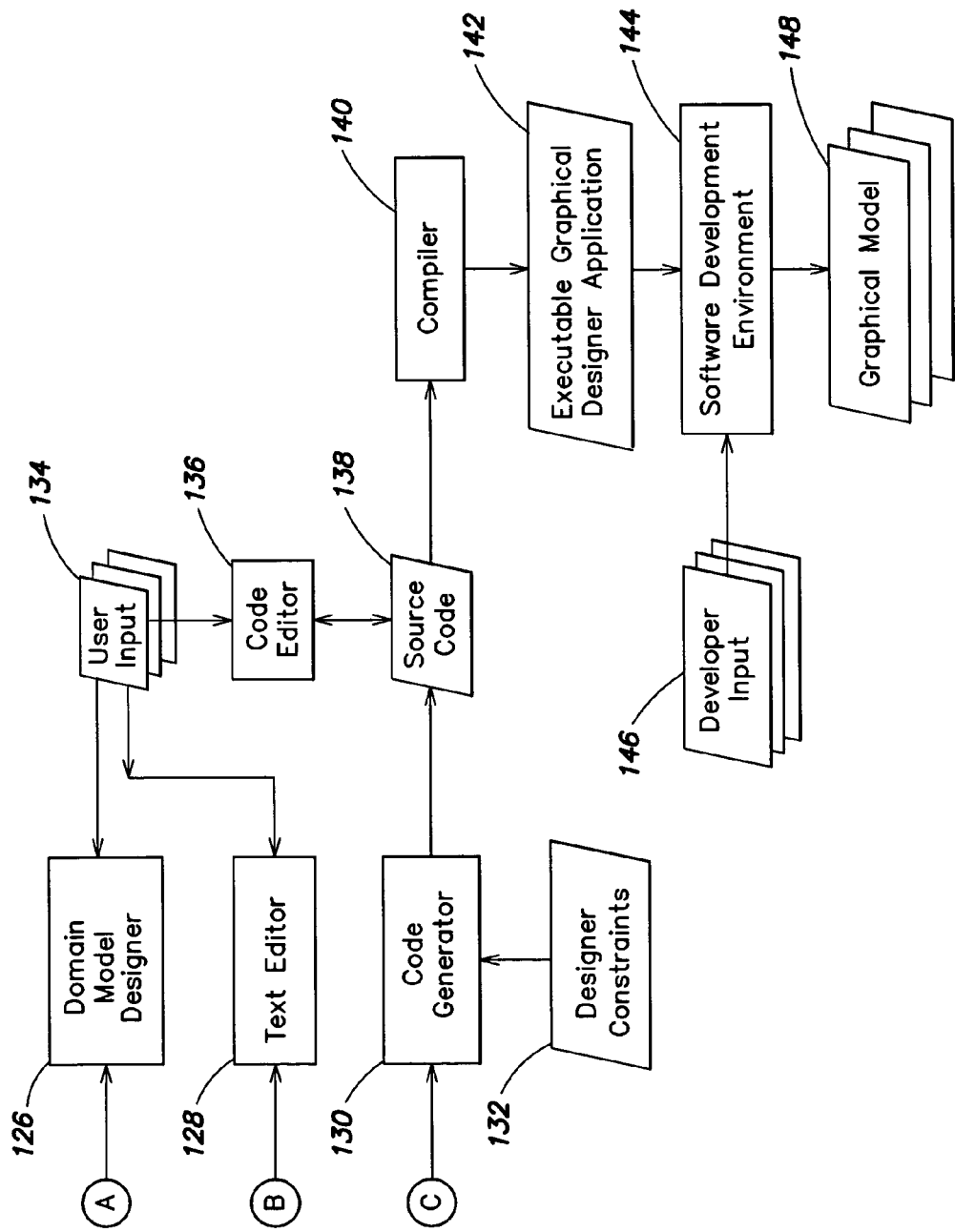

FIGS. 2A and 2B comprise a block diagram illustrating an example of a system 100 for developing and/or executing a graphical designer application. "Developing" a graphical designer application may include creating and/or modifying a graphical designer application. System 100 is merely an illustrative embodiment of a system for developing a graphical designer application, and is not intended to limit the scope of the invention. Any of numerous other implementations of such a system, for example, variations of system 100, are possible and are intended to fall within the scope of the invention.

The system 100 may include any of: definitions generator 106, data source 108, domain model designer 126, text editor 128, code generator 130, code editor 136, compiler (e.g., builder) 140, data files generator (not shown), graphical designer development framework (not shown), software development environment 144 and other elements. One or more elements of system 100 may be implemented as part of an Integrated Development Environment (IDE) such as, for example, Microsoft® Visual Studio® (MVS) available from Microsoft Corporation (e.g., as discussed below in Appendices I-III and V).

The graphical designer development framework may be provided to assist in one or more functions performed by components of system 100. For example, in an embodiment, the graphical designer development framework may be implemented in accordance with DSL technology available from Microsoft Corporation, for example, as described on the DSL website and/or as described in Appendices I-III and V.

Definitions generator 106 may be configured to receive user input 102 and generate definitions 114. User input 102 may include a user-selected graphical-modeling language 104 and template 106. The graphical modeling language 104 selected by the user is the language for which the eventually generated executable graphical designer application 142 will be configured to generate graphical models. In some embodiments, the graphical-modeling language 104 may not be selectable by the user and/or application 142 may be configured to generate graphical models in accordance with more than one graphical-modeling language (in which case, the user may be enabled to enter multiple languages 104). Definitions generator 106 may access a list of available languages 112, which may be stored in data source 108. Data source 108 may be any of a plurality of types of data sources such as, for example, a data base (e.g., an object-oriented data base, relational database, file system, other type of database, or any suitable combination thereof). Other information discussed with respect to FIGS. 2A and 2B may be stored in data source 108 or another data source.

In some embodiments of the invention, pre-defined templates or particular types of graphical designer applications may be available (e.g., by a graphical designer development framework such as, for example, the framework provided by DSL technology), and may be stored as templates 110 in data source 108. Each template may provide default information about a particular type of graphical designer from which definitions 114 may be generated. The "type" to which a template corresponds may correspond to a particular model domain such as, for example, a business model domain, data model domain, class model domain, deployment model domain, etc.

Definitions generator 106 may provide a user a list of available graphical-modeling languages 112 and templates 110, from which the user may make selections 104 and 106. Further generator 106 may be configured to enable a user to enter selections 104 and 106 and check them against available languages 112 and templates 110. Generator 106 may be configured to extract template information and language information 113 from data source 108 corresponding to selections 106 and 104, respectively, to use in generating definitions 114. Definitions generator 106 may include a user interface (e.g., a GUI) enabling a user to provide user input 102. For example, definitions generator 106 may implement a wizard to assist a user in providing input 102 such as, for example, the DSL wizard described in Appendix I, pages 5-6.

As used herein, a "user interface" is an application or part of an application (i.e., a set of computer-readable instructions) that enables a user to interface with an application during execution of the application. A user interface may include code defining how an application outputs information to a user during execution of the application, for example, graphically through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is graphically presented (i.e., displayed) to the user, and defines how the user can navigate the graphical presentation (i.e., display) of information and input information in the context of the graphical presentation. During execution of the application, the user interface may control the graphical presentation of information and enable the user to navigate the graphical presentation and enter information in the context of the graphical presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven graphical user interfaces. As used herein, the graphical presentation of information presented by a user interface or GUI is referred to as a "user interface display" or a "GUI display," respectively.

Definitions 114 may include an object-types definition 118, graphical elements definition 122 and mapping definition 124. Object-types definition 118 is a definition of one or more object types that can be represented in graphical models developed using a graphical designer application. The object-types may be determined based on the template selection 106 made by a user, and may correspond a particular model domain. The definition 118 may be formatted in accordance with one or more technologies such as, for example, a mark-up language such as XML or SGML, a special-purpose textual language, a binary format, or another type of technology.

It should be appreciated that any of definitions 118, 122 and 124 may be developed independently of definitions generator 106 or another automated process. That is, any of definitions 118, 122 and 124 may be manually coded by a developer.

In some embodiments, definitions 114 must satisfy designer constraints 132 in order to generate source code 138. If definitions 114 do not conform to designer restraints 132, an error message may be displayed to the user. The user then may modify one or more of the definitions 114 to conform with the restraints. Designer constraints are discussed in more detail below in relation to code generator 130.

In some embodiments, object-types definition 118 is included in a domain model file 116 and may be edited by a domain model designer 126, for example, as described in Appendix III with respect to DSL.

Graphical elements definition 122 defines graphical elements that can employed by users of a graphical designer application to develop graphical models in a particular graphical-modeling programming language, and mapping definition 124 may define a mapping between graphical elements defined by definition 122 and the object-types defined by definition 118. In some embodiments, definitions 122 and 124 are included within a designer definitions file, which may be written in accordance with a mark-up language such as XML or SGML, or in accordance with another technology such as, for example, a special-purpose textual language, a binary format or another technology.

Figure 3:
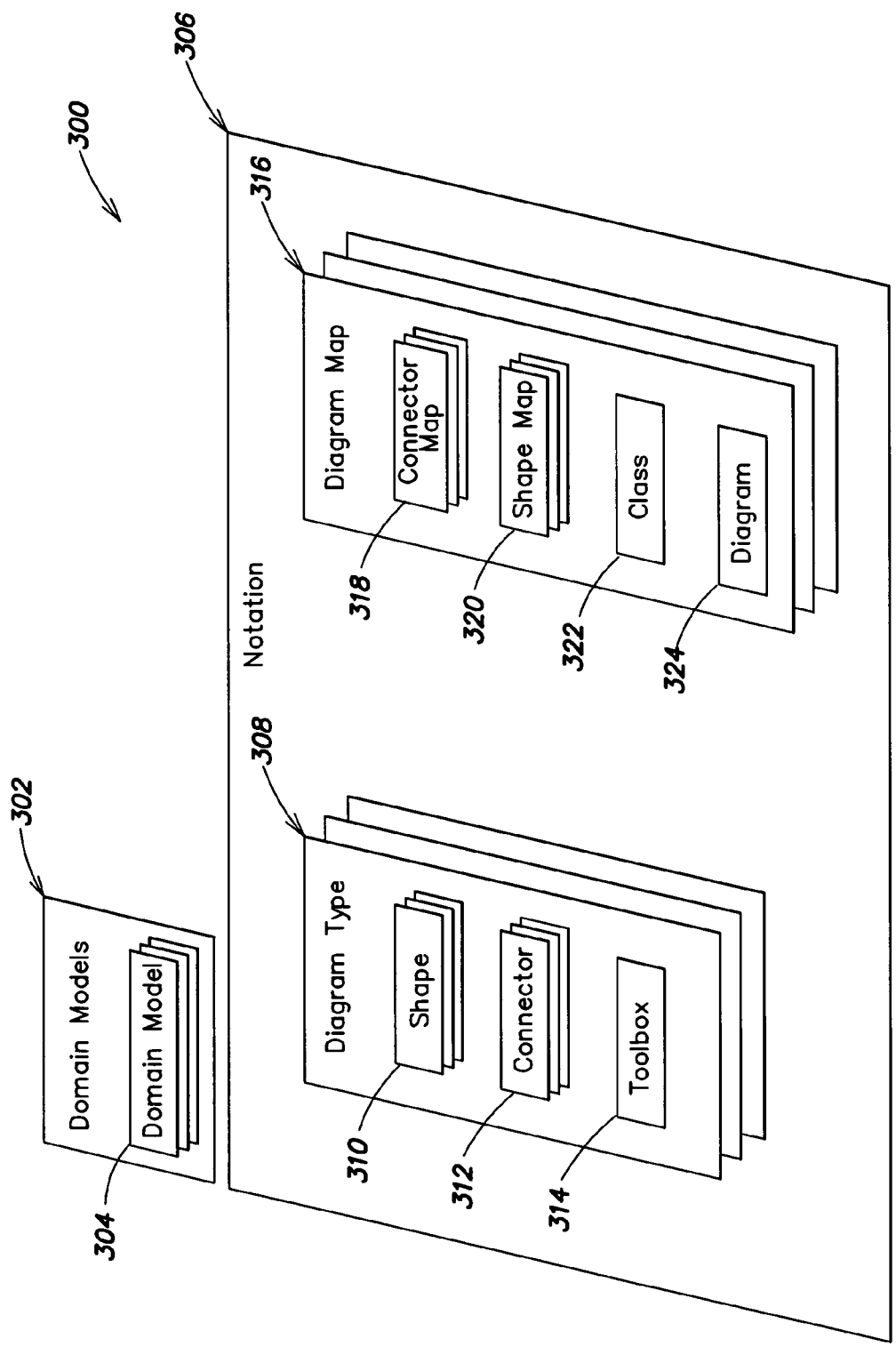
FIG. 3 is a block diagram illustrating an example of a designer definitions file in accordance with some embodiments of the invention.

Digressing briefly from system 100, FIG. 3 is a block diagram illustrating an example of a designer definitions file 300 in accordance with some embodiments of the invention. Designer definitions file 300 is merely an illustrative embodiment of a designer definitions file, and is not intended to limit the scope of the invention. Any of numerous other implementations of a designer definitions file, for example, variations of file 300, are possible and are intended to fall within the scope of the invention.

File 300 may be implemented in accordance with any of a variety of technologies such as Microsoft's DSL technology, for example, as shown in Appendix II. File 300 includes any of: domain models component 302, notation component 306 and other components. The domain models component 302 of file 300 lists references to domain models 304 which the eventual graphical designer application 242 is intended to support. For example, one of domain models 304 may specify domain model file 116.

Notation components 306 includes definitions of the types of diagrams for the graphical designer application and defines maps between these diagram types and object-types of the object-types definition 118. Each diagram type component 308 defines the graphical elements that can be used for a particular type of diagram. Diagram elements of a diagram-type 308 may include: one or more shape components 310; one or more connector components 312, a toolbox component 314 and other components. Each shape component 310 defines a specific shape that may be used to represent object-types on a graphical model prepared by a graphical designer application. Types of shapes may include geometry shapes and image shapes. Geometry shapes may include: circle, custom, diamond, ellipse, rectangle, rounded rectangle and other shapes. An image shape is defined by reference to an image file. Further, each shape element 310 may include the definition of types of decorators (e.g., text and icon decorators) that can appear on a shape, and the position at which the decorator may appear.

Each connector component 312 of diagram-type component 308 may define a type of connector that can be used to connect objects on a graphical model. Each connector component 312 may define the properties of a type of connector such as, color and dash style. Further, a connector component may define decorators (e.g., text decorators) that may be used with the connector-type, and may specify the location at which the decorator may appear on the connector. Other graphical adornments may be defined by a connector component (e.g., arrowheads having various shapes). Also, a connector component can define other attributes of a connector such as, for example, how it graphically connects objects (e.g., rectilinear, straight, curved, combination of the foregoing, etc.).

Toolbox component 314 may define a toolbox (e.g., toolbox 152 of FIG. 1) that may be used by a graphical designer application to develop graphical models. Toolbox component 314 defines the items to be provided in the toolbox for the graphical designer application.

Diagram map component 316 defines how graphical elements defined within diagram-types component 308 map to object-types of a particular domain model 304 defined in the domain models component 302. For example, there may be one diagram map 316 component per pairing of diagram-type and domain model. In some embodiments, diagram map component 316 associates a diagram-type defined by component 308 to a particular class of a domain model defined by component 304 to which the diagram-type maps.

Class component 322 references the class of the domain model component 304 to which the diagram-type 308 represented by the diagram map component 316 maps. Diagram component 324 of a diagram map component 316 references the diagram-type to which the diagram map 316 maps.

Each shape map component 320 associates the class identified by class component 322 with a particular shape defined by one of the shape components 310. Each connector map component 318 defines a mapping between the class referenced by class component 322 and a connector reference by one of the connector components 312.

Returning to FIG. 2B, the text editor 128 or other type of editor may be configured to enable a user to modify (e.g., edit) a designer definition file (e.g., file 120). It should be appreciated that objects-type definition 118 also may be implemented in a format (e.g., a mark up language file such as an XML file) enabling it to be modified using text editor 128. In addition, one or both of graphical elements definition 122 and mapping definition 124 may be implemented as a domain model file enabling modifications to be made by these definitions using domain model designer 126. One or more of the elements of system 100, including domain model designer 126 and text editor 128, may be implemented as part of a user interface, or may include a user interface component themselves.

Figure 4:
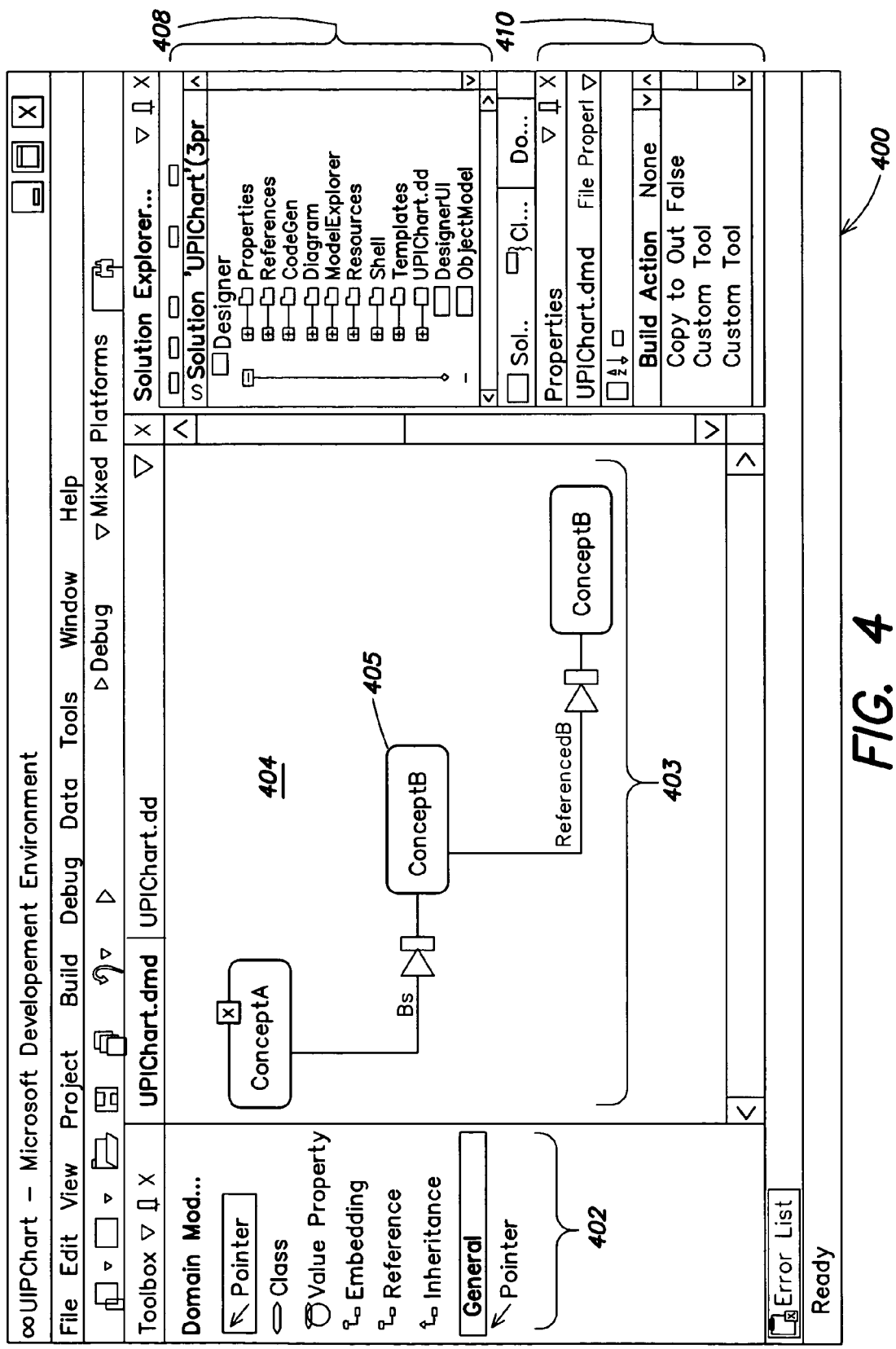
FIG. 4 is a screen shot illustrating an example of a user interface display of a user interface implementing a domain model designer according to some embodiments of the invention.

Digressing briefly again from system 100, FIG. 4 is a screen shot illustrating an example of a user interface display 400 of a user interface implementing, among other things, a domain model designer 126. Display 400 is merely an illustrative embodiment of a user interface display implementing a domain model designer, and is not intended to limit the scope of the invention. Any of numerous other implementations of such a display, for example, variations of display 400, are possible and are intended to fall within the scope of the invention.

Display 400 may include any of: toolbox 402, modeling surface 404, domain explorer 408, and properties window 410. Items from toolbox 402 may be used to create a domain model (e.g., domain model 403), including one or more domain objects (e.g., object 405) and relationships defined between the domain objects). Properties for objects and relationships between objects can be modified using object window 410. A graphical user interface for a domain model designer (e.g., domain model designer 126) can be implemented in any of a variety of ways such as, for example, as described in Appendix III.

Returning to FIG. 2B, domain model designer 126, text editor 128 and/or other types of tools can be used to modify definitions 114 to modify executable graphical designer application 142, and to modify its functionality if necessary.

Code generator 130 may be configured to receive definitions 114 (including one or more of definitions 118, 122, and 124) and generate source code 138 from which executable graphical designer application 142 may be compiled (e.g., built) by compiler 140. Source code 138 may be written in any of a plurality of programming languages, including any suitable programming languages described herein. Code generator 130, as well as definitions generator 106, may be supported by a graphical designer development framework (e.g., a framework in accordance with DSL technology) that makes it easier to define domain models and to construct a custom graphical designer, for example, hosted in MVS. Code generator 130 (and/or one or more other suitable components of system 100 individually or in combination with code generator 130) may be configured to apply designer constraints 132 to the definitions 114 that it receives, to verify that definitions 114 conform with the designer constraints.

Applying designer constraints may include ensuring that the one or more definitions define a working graphical designer application, which may include verifying that one or more definitions are syntactically correct (e.g., by applying an XML Schema Definition (XSD)). Applying designer constraints also may include applying other constraints defined by a graphical designer development framework (e.g., a framework in accordance with DSL technology). Further, designer constraints may be applied to the generated source code itself and other generated components (e.g., data files) defined in the graphical designer application. These designer constraints also may be supplied by a graphical designer development framework and/or other code. Code generator 130 may be configured to display an error message if one of the definitions does not satisfy the designer constraints 132.

In addition to modifying the behavior of graphical designer application 142 through the use of domain model designers 126 and text editor 128, such behavior may be modified by editing the source code 138 using code editor 136. Code editor 136 may be any of a variety of types of code editors such as, for example, a code editor available as part of MVS. Domain model designer 126, text editor 128 and code editor 136 each may be configured to receive user input, and in various combinations modify the behavior of graphical designer application 142.

In addition to source code 138, one or more data files may be generated by a data file generator (not shown). These data files may include resource files (e.g., bit maps and strings), templates and other data files to be used by the graphical designer application when executed. Together, the generated source code and the one or more data files may define a complete graphical designer application ready to be compiled and executed without further modification.

Compiler (e.g., builder) 140 may receive source code 138 and generate the executable graphical designer application 142. Application 142 may be integrated as part of a software development environment 144 such as, for example, an IDE (e.g., MVS). For example, when the source code (and possibly data files) are generated, the graphical designer application may be registered with the software development environment 144. A user (e.g., a graphical design developer) then may launch the graphical designer application from within the software development environment. The graphical designer application 142 and/or the software development environment 144 may be configured to use a graphical designer development framework (e.g., a framework provided by DSL technology) to assist the user in developing graphical models. Application 142 may be launched within environment 144 to generate one or more graphical models 148, for example, using developer input 146.

System 100 and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one or more devices that include one or more components of system 100, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 6 and 7.

Figure 5:
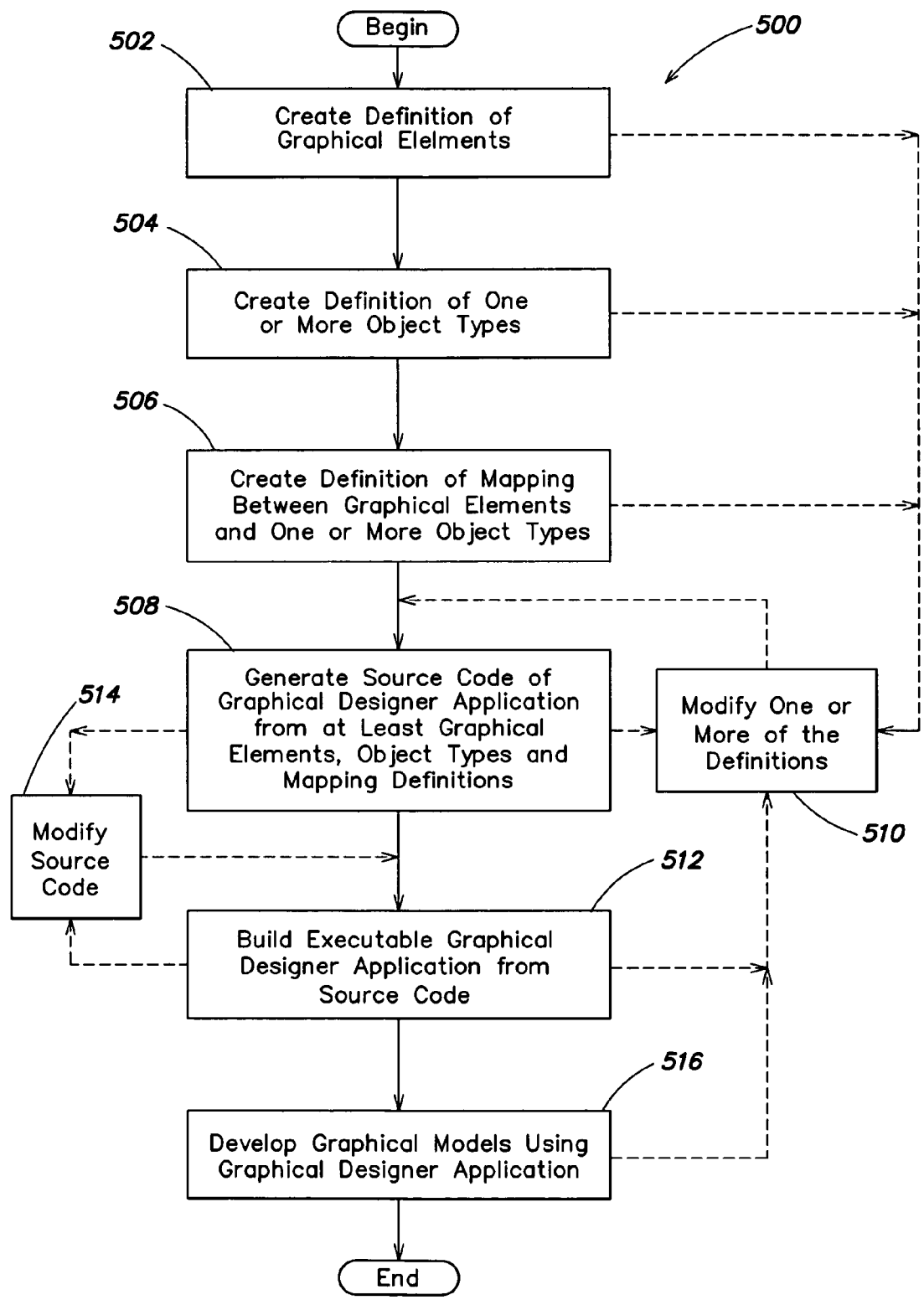
FIG. 5 is a flowchart illustrating an example of a method of developing and executing a graphical designer application to produce graphical models according to some embodiments of the invention.

FIG. 5 is a flowchart illustrating an example of a method 500 of developing and executing a graphical designer application to produce graphical models. Method 500 is merely an illustrative embodiment of a method for developing and executing a graphical designer application, and is not intended to limit the scope of the invention. Any of numerous other implementations of such a method, for example, variations of method 500, are possible and are intended to fall within the scope of the invention. Method 500 and acts thereof may be implemented using one or more elements of system 100 as described above in relation to FIGS. 2A and 2B.

In Acts 502, 504 and 506, definitions of graphical elements, one or more object-types, and a mapping between the graphical elements and the one or more object-types, respectively, may be created. For example, as described above in relation to FIG. 2A, a definitions generator 106 may generate these definitions in response to user input (e.g., user input 102), utilizing template information and graphical-modeling language information which may be stored in a data source (e.g., data source 108). Any of Acts 502, 504, and 506, however, may be implemented in a non-automated or semi-automated fashion (e.g., without use of definitions generator 106) by one or more developers, as described above.

In Act 508, source code of a graphical designer application may be generated from at least one or more of the graphical elements definition, object-types definition and mapping definition, for example, as described above in relation to code generator 130 of FIG. 2B.

In another Act (not shown), one or more data files to be accessed by the graphical designer application may be generated from at least one or more of the graphical elements definition, object types definition and mapping definition, for example, as described above in relation to FIG. 2B.

In Act 512, an executable graphical designer application may be built (i.e., compiled) from the generated source code, for example, as described above in relation to FIG. 2B. In Act 516, graphical models may be developed using the generated graphical designer application.

During the performance of method 500, one or more of the definitions created in Acts 502-506 may be modified in Act 510, for example, using a domain model designer 126 and/or text editor 128. After such modifications have been made, the source code may be re-generated and the graphical designer application rebuilt, which may modify the functionality of the graphical designer application.

At any time after the performance of Act 508, the generator source code may be modified in Act 514. For example, using code editor 136 described above in relation to FIG. 2B. The modified source code then may be rebuilt in Act 512 to produce a modified graphical designer application, which may have modified behavior depending on the modifications made to the source code.

Method 500 may include additional acts. Further, the order of the acts performed as part of method 500 is not limited to the order illustrated in FIG. 51, as the acts may be performed in other orders and/or one or more of the acts may be performed in series or in parallel, at least partially. For example, Act 504 may be performed before or in parallel to Act 502.

Method 500, acts thereof and various embodiments and variations of this method and these acts, individually or in combination, may be defined by computer-readable signals tangibly embodied on or more computer-readable media such as, for example, non-volatile recording media, integrated circuit memory elements, or a combination thereof. Computer-readable media can be any available media that can be accessed by a computer. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 500 or any acts thereof), and/or various embodiments, variations and combinations thereof. Such instructions may be written in any of a plurality of programming languages, for example, Java, J#, Graphical Basic, C, C#, or C++, Fortran, Pascal, Eiffel, Basic, COBOL, other programming languages, or any of a variety of combinations thereof. The computer-readable media on which such instructions are embodied may reside on one or more of the components of any of systems 100, 500, and 700 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement aspects of the present invention discussed above.

Figure 6:
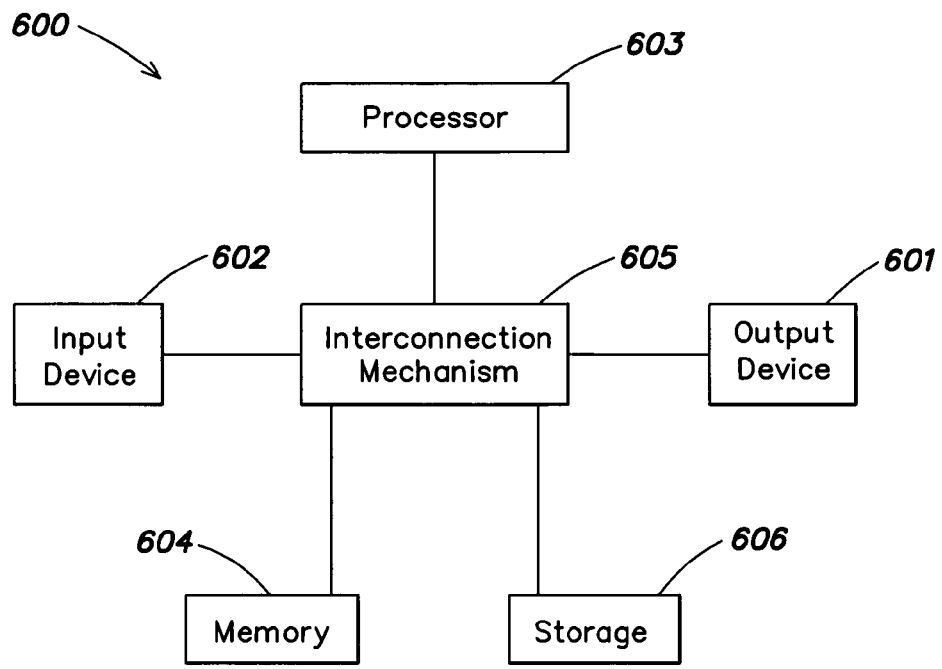
FIG. 6 is a block diagram illustrating an example of a computer system on which some embodiments of the invention may be implemented.
Figure 7:
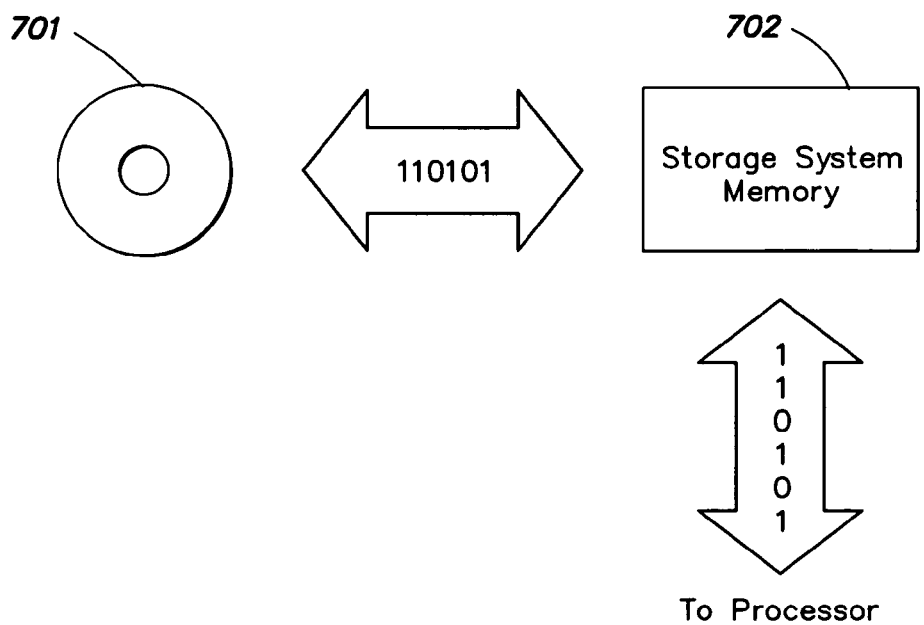
FIG. 7 is a block diagram illustrating an example of a storage system that may be used as part of the computer system to implement some embodiments of the invention.

It should be appreciated that any single component or collection of multiple components of a computer system, for example, the computer system described in relation to FIGS. 6 and 7, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 600 such as that shown in FIG. 6. The computer system 600 may include a processor 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 1202, for example, a keyboard, mouse, trackball, microphone, touch screen, and one or more output devices 1201, for example, a printing device, display screen, speaker. In addition, computer system 600 may contain one or more interfaces (not shown) that connect computer system 600 to a communication network (in addition or as an alternative to the interconnection mechanism 605).

The storage system 1206, shown in greater detail in FIG. 7, typically includes a computer-readable-and-writeable nonvolatile recording medium 701 in which signals are stored that define a program to be executed by the processor or information stored on or in the medium 701 to be processed by the program. The medium may, for example, be a disk or flash memory. Typically, in operation, the processor causes data to be read from the nonvolatile recording medium 701 into another memory 702 that allows for faster access to the information by the processor than does the medium 701. This memory 702 is typically a volatile, random access memory such as a dynamic random access memory (DRAM) or static memory (SRAM). It may be located in storage system 606, as shown, or in memory system 604, not shown. The processor 603 generally manipulates the data within the integrated circuit memory 604, 702 and then copies the data to the medium 701 after processing is completed. A variety of mechanisms are known for managing data movement between the medium 701 and the integrated circuit memory element 604, 702, and the invention is not limited thereto. The invention is not limited to a particular memory system 604 or storage system 1206.

Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components that that shown in FIG. 6.

Computer system 600 may be a general-purpose computer system that is programmable using a high-level computer programming language. Computer system 600 also may be implemented using specially-programmed, special-purpose hardware. In computer system 600, processor 603 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as Smalltalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any suitable combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of developing a graphical designer application to be used in developing graphical models using a graphical-modeling programming language, the method comprising acts of:
(A) receiving a definition of graphical elements that can be employed by users of the graphical designer application to develop graphical models using the graphical designer application; and
(B) receiving a definition of one or more object types that can be represented in graphical models developed, each object type being associated with a business domain model, a data domain model, a class domain model or a deployment domain model;
(C) receiving a mapping between each of the graphical elements for which a definition is received in (A) and an object type for which a definition is received in (B);
(D) generating, from at least the graphical elements definition, the object types definition and the mapping, source code defining at least a portion of the graphical designer application and one or more data files to be accessed by the graphical designer application during execution, the source code and one or more data files together defining the graphical designer application, ready for compilation and execution without further modification;
(F) modifying functionality of the graphical designer application by modifying one or more of the definitions and re-generating the source code from the modified definitions; and
(F) outputting the source code.

2. The method of claim 1, wherein the graphical elements definition and the object types definition are part of one or more files,
wherein the act (A) comprises receiving at least one of the one or more files, and
wherein the act (B) comprises receiving at least one of the one or more files.

3. The method of claim 1, further comprising an act of:
generating, from at least the graphical elements definition and the object types definition, one or more data files to be accessed by the graphical designer application during execution, the source code and one or more data files together defining the graphical designer application, ready for compilation and execution without further modification.

4. The method of claim 1, further comprising:
(E) modifying functionality of the graphical designer application by modifying the source code.

5. The method of claim 1, wherein the act (D) comprises verifying that one or more of the definitions conform to pre-defined graphical designer constraints.

6. A system for developing a graphical designer application to be used in developing graphical models using a graphical-modeling programming language, the system comprising at least one processor programmed to implement:
a code generator operative to:
receive as input a definition of graphical elements that can be employed by users of the graphical designer application to develop graphical models using the graphical designer application,
receive as input a definition of one or more object types that can be represented in graphical models developed using the graphical designer application, each object type being associated with a business domain model, a data domain model, a class domain model or a deployment domain model,
receive as input a mapping between each of the graphical elements and one of the object types;
generate, from at least the graphical elements definition, the object types definition and the mapping, source code defining at least a portion of the graphical designer application and one or more data files to be accessed by the graphical designer application during execution, the source code and one or more data files together defining the graphical designer application, ready for compilation and execution without further modification, and
output the source code; and
a user interface operative to enable a user to modify functionality of the graphical designer application by modifying one or more of the definitions;
wherein the code generator is operative to re-generate the source code from the modified definitions.

7. The system of claim 6, wherein the graphical elements definition and the object types definition are part of one or more files, wherein the code generator is operative to receive the one or more files.

8. The system of claim 6, further comprising:
a user interface enabling a user to modify functionality of the graphical designer application by modifying the source code.

9. The system of claim 6, wherein the code generator is operative to verify that one or more of the definitions conform to pre-defined graphical designer constraints.

10. A computer program product comprising:
a computer storage medium; and
computer-readable signals, stored on the computer storage medium, that define instructions that, as a result of being executed by a computer, control the computer to perform a process of developing a graphical designer application to be used in developing graphical models using a graphical-modeling programming language, the process comprising acts of:

(A) receiving a definition of graphical elements that can be employed by users of the graphical designer application to develop graphical models using the graphical designer application; and (B) receiving a definition of one or more object types that can be represented in graphical models developed, each object type being associated with a business domain model, a data domain model, a class domain model or a deployment domain model;

(C) receiving a mapping between each of the graphical elements for which a definition is received in (A) and an object type for which a definition is received in (B); and (D) generating, from at least the graphical elements definition, the object types definition and the mapping, source code defining at least a portion of the graphical designer application and one or more data files to be accessed by the graphical designer application during execution, the source code and one or more data files together defining the graphical designer application, ready for compilation and execution without further modification;

(E) modifying functionality of the graphical designer application by modifying one or more of the definitions and re-generating the source code from the modified definitions; and (F) outputting the source code.

11. The computer program product of claim 10, the process further comprising:

(F) modifying functionality of the graphical designer application by modifying the source code.

* * * * *